United States Patent
Cui et al.

(10) Patent No.: US 8,949,546 B2
(45) Date of Patent: Feb. 3, 2015

(54) NETWORK CACHE SYSTEM FOR REDUCING REDUNDANT DATA

(75) Inventors: Liang Cui, Beijing (CN); Chengzhong Liu, Beijing (CN); Zhifeng Xia, Beijing (CN)

(73) Assignee: VMware, Inc., Palo Alto, CA (US)

( * ) Notice: Subject to any disclaimer, the term of this patent is extended or adjusted under 35 U.S.C. 154(b) by 317 days.

(21) Appl. No.: 13/485,119

(22) Filed: May 31, 2012

(65) Prior Publication Data
US 2013/0326156 A1 Dec. 5, 2013

(51) Int. Cl.
*G06F 12/00* (2006.01)
*G06F 3/06* (2006.01)

(52) U.S. Cl.
CPC ............ *G06F 3/0601* (2013.01); *G06F 3/0659* (2013.01)
USPC ........... 711/141; 711/100; 711/113; 711/118; 711/119; 711/143; 711/154

(58) Field of Classification Search
None
See application file for complete search history.

(56) References Cited

U.S. PATENT DOCUMENTS 6,466,248 B1 * 10/2002 Spann et al. ............... 348/14.08
8,548,012 B2 * 10/2013 Guo et al. .................... 370/912

OTHER PUBLICATIONS

B. Zhu et al., "Avoiding the Disk Bottleneck in the Data Domain Deduplication File System." FAST 2008: 6th USENIX Conference on File and Storage Technologies, pp. 269-282.
M. Korupolu et al., "Coordinated Placement and Replacement for Large-Scale Distributed Caches." IEEE Trans. On Knowledge and Data Engineering, vol. 14, No. 6, Dec. 2002, pp. 1-20.

* cited by examiner

*Primary Examiner* — Midys Rojas

(57) ABSTRACT

Embodiments include a local cache management system that is configured to be coupled to a local cache and that includes an index engine configured to store fingerprints of message segments stored in the local cache and a redundancy management engine coupled to the index engine. The redundancy management engine includes an adaptive emitter configured to receive a message segment to be transmitted to a remote device, determine expected latency costs of a plurality of transmission algorithms, and select a transmission algorithm, such as by selecting the lowest expected latency cost. The adaptive emitter is also configured to determine whether the message segment is stored within a remote cache management system associated with the remote device, and transmit the message segment through a network to the remote cache management system using the selected transmission algorithm upon a determination that the message segment is not stored within the remote cache management system.

27 Claims, 9 Drawing Sheets

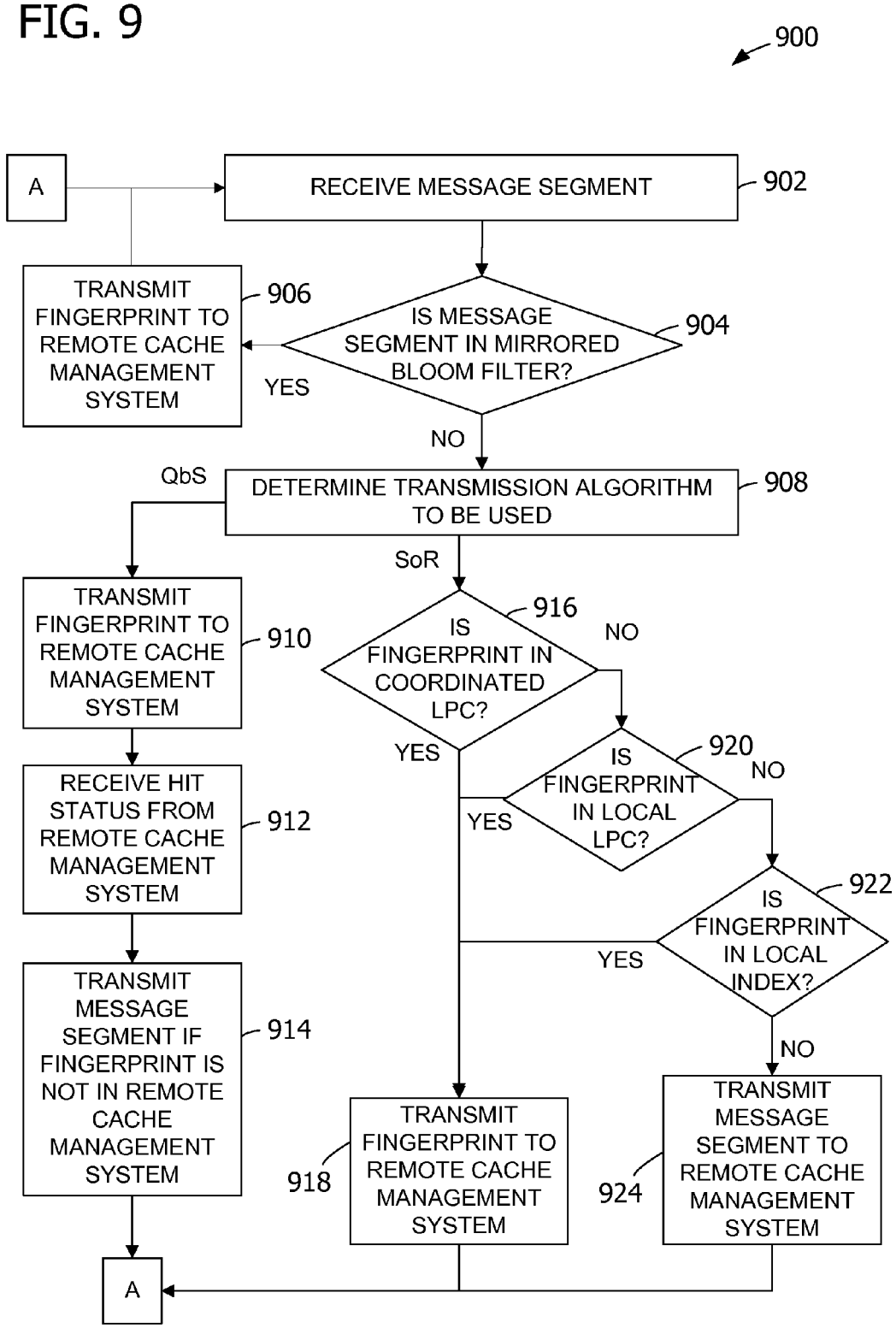

NETWORK CACHE SYSTEM FOR REDUCING REDUNDANT DATA

BACKGROUND

Software applications, such as virtual machines (VMs), may be executed by a group, or "cluster," of host computing devices. Each VM creates an abstraction of physical computing resources, such as a processor and memory, of the host executing the VM and executes a "guest" operating system, which, in turn, executes one or more software applications. The abstracted resources may be functionally indistinguishable from the underlying physical resources to the guest operating system and software applications.

At least some host computing devices are grouped together in a common site, such as a datacenter. A datacenter may be coupled to other datacenters by one or more wide area networks (WANs). Because of the large number of computing devices within some known datacenters, a large amount of data may be transmitted between datacenters through the WAN. Accordingly, the bandwidth of the WAN may be constrained and data transmission delays may undesirably be introduced.

To reduce the bandwidth utilization by the datacenter computing devices, at least some known datacenter computing devices use deduplication systems or other systems that reduce redundant data transmitted through the WAN. Such deduplication systems use deduplication caches to store frequently used data. The deduplication systems also determine if data to be transmitted over the WAN is already stored in a deduplication cache at a destination site. If the data to be transmitted is already stored in a deduplication cache, a fingerprint of the data that is smaller than the data itself may be transmitted in place of the data. The deduplication system at the destination site may then retrieve the data from its cache based on the fingerprint.

However, in some known deduplication systems, there may be significant latency costs associated with determining whether the data to be transmitted is stored within the deduplication cache. If the deduplication cache is searched to determine whether the data is stored within the cache, a latency cost may be added to the latency of the data transmission if the data is not located within the cache. Such a latency cost is sometimes known as a "cache miss penalty." Additionally, during operation of the deduplication systems, one or more deduplication caches may become unsynchronized with respect to other caches. Specifically, a local deduplication system may predict that data is stored within a remote deduplication cache, for example, based on a fingerprint of the data stored within the local deduplication system, but the data may have been overwritten in the remote deduplication cache. The loss of synchronization between deduplication systems is sometimes referred to as a "cache synch-up" or a "cache synchronization" issue.

SUMMARY

Embodiments described herein include a system including a processor and a memory device coupled to the processor. The memory device includes a local cache management system that is executable by the processor and that is configured to be coupled to a local cache. The local cache management system includes an index engine configured to store fingerprints of message segments stored in the local cache and a redundancy management engine coupled to the index engine. The redundancy management engine includes an adaptive emitter configured to receive a message segment to be transmitted to a remote device, determine an expected latency cost of each of a plurality of transmission algorithms, and select a transmission algorithm of the plurality of transmission algorithms on a basis of the expected latency costs, with a preference to the lowest expected latency cost. The adaptive emitter is also configured to determine whether the message segment is stored within a remote cache management system associated with the remote device, and transmit the message segment through a network to the remote cache management system using the selected transmission algorithm upon a determination that the message segment is not stored within the remote cache management system.

BRIEF DESCRIPTION OF THE DRAWINGS

FIG. 9 is a flow diagram of an exemplary method of transmitting a message segment from a local cache management system to a remote cache management system.

DETAILED DESCRIPTION

Figure 1:
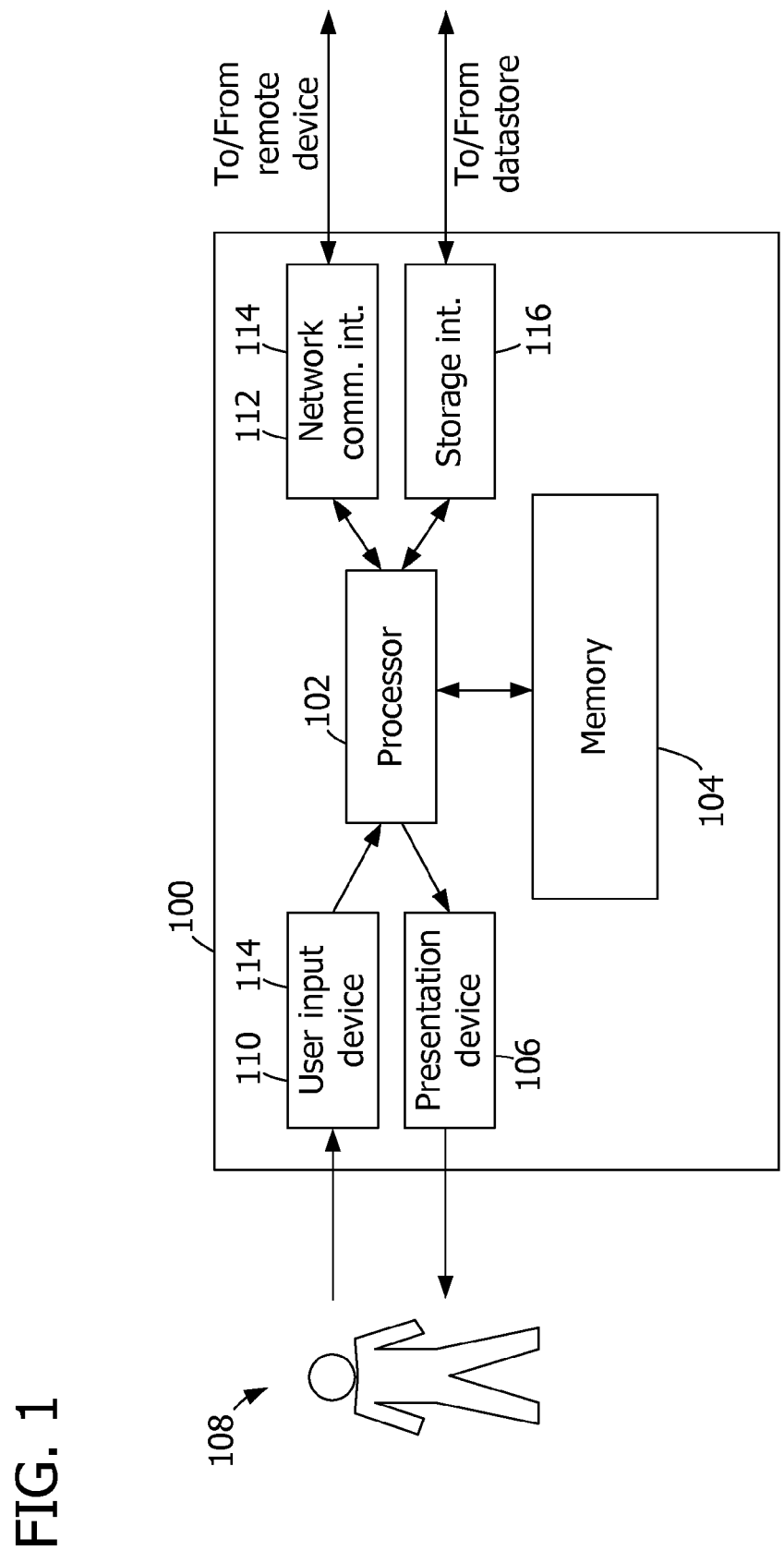
FIG. 1 is a block diagram of an exemplary computing device.

In one embodiment, a distributed network system facilitates reducing redundant data transmitted within the network system. The network system includes a plurality of cache management systems coupled together by a network. Each cache management system includes a redundancy management engine and an index engine coupled to the redundancy management engine. Each cache management system is also coupled to at least one cache stored within a storage device.

The redundancy management engine includes a segment generator that partitions a stream of data into a plurality of message segments and an adaptive emitter that combines the message segments into one or more messages to be sent to a remote cache management system. The adaptive emitter also selects a transmission algorithm to be used to transmit the message and/or message segments to the remote cache management system. In addition, the redundancy management engine includes a mirrored bloom filter that is associated with a bloom filter of the remote cache management system, and a remote cache synchronizer that facilitates updating one or more components of the cache management system using a dedicated cache channel.

The index engine includes a coordinated locality preserved caching (LPC) module that is associated with an LPC module of the remote cache management system. The index engine also includes a local LPC module, a local bloom filter, and a coordinated replacement module for replacing data within caches associated with the local cache management system and the peer cache management systems.

In operation, the adaptive emitter determines expected latency costs of a plurality of transmission algorithms, such as a query-before-send (QbS) algorithm and a send-or-resend (SoR) algorithm. The adaptive emitter selects the transmission algorithm on the basis of the having determined latency costs, such as by selecting the lowest expected latency cost to transmit a plurality of message segments to the remote cache management system. If the QbS algorithm is selected, the adaptive emitter transmits an array of fingerprints of the message segments to the remote cache management system to determine whether the fingerprints are stored within the system. The remote cache management system transmits a hit status bitmap that indicates whether each fingerprint is stored in the remote cache management system. The adaptive emitter transmits the message segment associated with each fingerprint that is not stored within the remote cache management system.

If the SoR algorithm is selected, the adaptive emitter predicts whether each message segment and/or message segment fingerprint is stored within the remote cache management system based on whether each fingerprint is stored within the local cache management system. For example, the adaptive emitter determines whether each fingerprint is stored within the coordinated LPC module, the local LPC module, or the index of the local cache. If a fingerprint is stored within the local cache management system, the message segment is predicted to be stored within the remote cache management system, and the fingerprint, rather than the message segment itself, is transmitted to the remote cache management system to reduce a bandwidth utilization of the network. However, if the fingerprint is not stored within the local cache management system, the message segment is predicted to not be stored in the remote cache management system. Accordingly, the message segment is transmitted to the remote cache management system.

The cache management systems facilitate reducing the bandwidth utilization of the network by only transmitting message segments that are not stored within the remote cache management system, or that are not predicted to be stored within the remote cache management system. In addition, the cache management systems facilitate reducing a cache miss penalty that may be otherwise incurred if the message segment is not stored within the remote cache management system. The cache management systems also facilitate mitigating cache synchronization issues that may occur between the systems.

FIG. 1 is a block diagram of an exemplary computing device 100. Computing device 100 includes a processor 102 for executing instructions. In some embodiments, computer-executable instructions are stored in a memory 104 for performing one or more of the operations described herein. Memory 104 is any device allowing information, such as executable instructions, configuration options (e.g., threshold values), and/or other data, to be stored and retrieved. For example, memory 104 may include one or more computer-readable storage media, such as one or more random access memory (RAM) modules, flash memory modules, hard disks, solid state disks, and/or optical disks.

In some embodiments, computing device 100 also includes at least one presentation device 106 for presenting information to a user 108. Presentation device 106 is any component capable of conveying information to user 108. Presentation device 106 may include, without limitation, a display device (e.g., a liquid crystal display (LCD), organic light emitting diode (OLED) display, or "electronic ink" display) and/or an audio output device (e.g., a speaker or headphones). In some embodiments, presentation device 106 includes an output adapter, such as a video adapter and/or an audio adapter. An output adapter is operatively coupled to processor 102 and configured to be operatively coupled to an output device, such as a display device or an audio output device.

The computing device 100 may include a user input device 110 for receiving input from user 108. User input device 110 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of presentation device 106 and user input device 110.

Computing device 100 also includes a network communication interface 112, which enables computing device 100 to communicate with a remote device (e.g., another computing device 100) via a communication medium, such as a wired or wireless packet network. For example, computing device 100 may transmit and/or receive data via network communication interface 112. User input device 110 and/or network communication interface 112 may be referred to as an input interface 114 and may be configured to receive information, such as configuration options (e.g., threshold values), from a user. In some embodiments, presentation device 106 and/or user input device 110 are remote from computing device 100 and transmit and/or receive data via network communication interface 112.

Computing device 100 further includes a storage interface 116 that enables computing device 100 to communicate with one or more datastores. In exemplary embodiments, storage interface 116 couples computing device 100 to a storage area network (SAN) (e.g., a Fibre Channel network) and/or to a network-attached storage (NAS) system (e.g., via a packet network). The storage interface 116 may be integrated with network communication interface 112.

Figure 2:
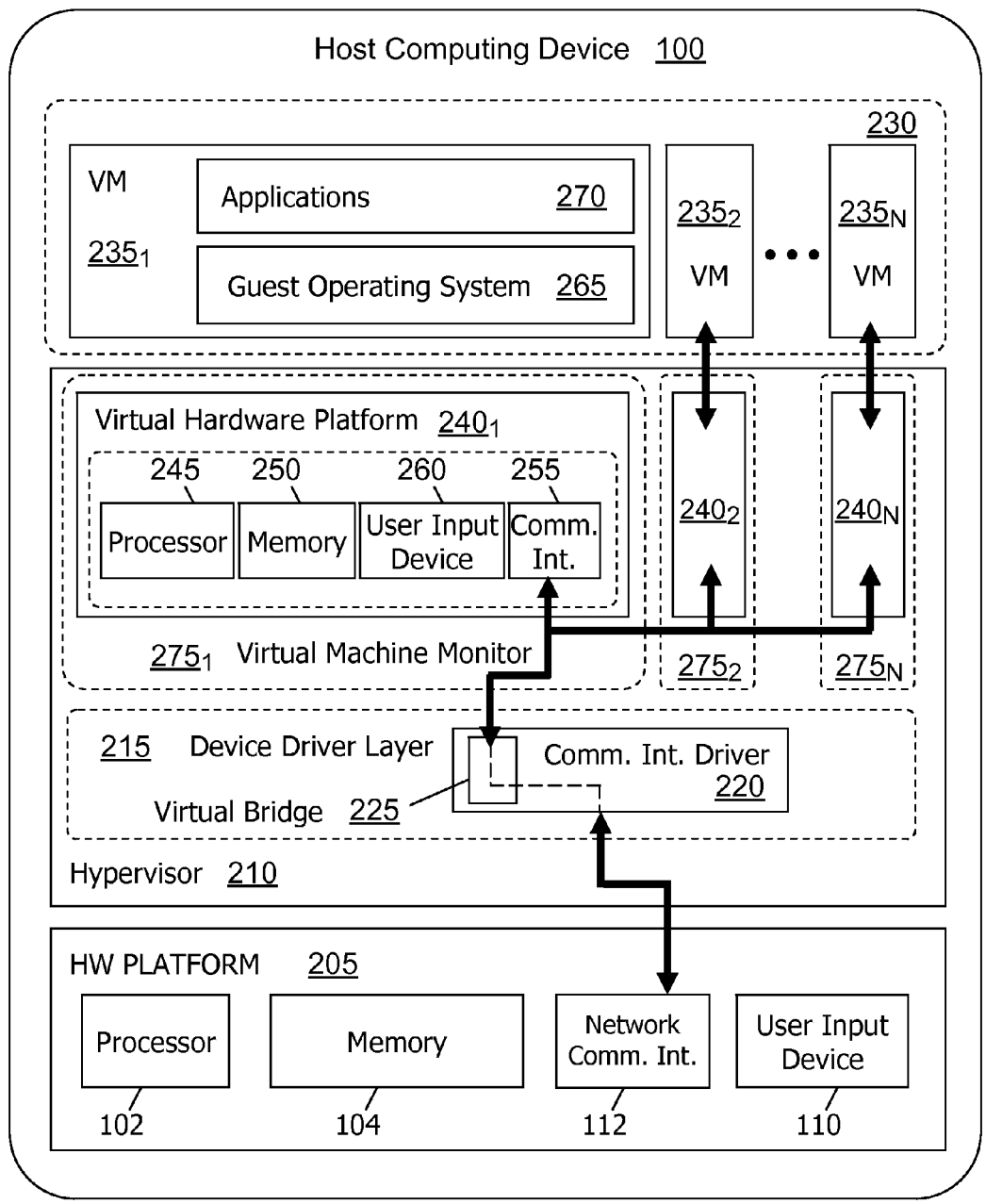
FIG. 2 is a block diagram of virtual machines that are instantiated on a computing device, such as the computing device shown in FIG. 1.

FIG. 2 depicts a block diagram of virtual machines $235_1$, $235_2 \ldots 235_N$ that are instantiated on a computing device 100, which may be referred to as a "host." Computing device 100 includes a hardware platform 205, such as an x86 architecture platform. Hardware platform 205 may include processor 102, memory 104, network communication interface 112, user input device 110, and other input/output (I/O) devices, such as a presentation device 106 (shown in FIG. 1). A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user input device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$). Each virtual hardware platform includes its own emulated hardware (such as a processor 245, a memory 250, a network communication interface 255, a user input device 260 and other emulated I/O devices in VM $235_1$).

In some embodiments, memory 250 in first virtual hardware platform $240_1$ includes a virtual disk that is associated with or "mapped to" one or more virtual disk images stored in memory 104 (e.g., a hard disk or solid state disk) of computing device 100. The virtual disk image represents a file system (e.g., a hierarchy of directories and files) used by first virtual machine $235_1$ in a single file or in a plurality of files, each of which includes a portion of the file system. In addition, or alternatively, virtual disk images may be stored in memory 104 of one or more remote computing devices 100, such as in a storage area network (SAN) configuration. In such embodiments, any quantity of virtual disk images may be stored by the remote computing devices 100.

Device driver layer 215 includes, for example, a communication interface driver 220 that interacts with network communication interface 112 to receive and transmit data from, for example, a local area network (LAN) connected to computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface may be assigned a unique virtual Media Access Control (MAC) address that enables virtual bridge 225 to simulate the forwarding of incoming data packets from network communication interface 112. In an embodiment, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM in computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Virtual hardware platforms $240_1$-$240_N$ may be considered to be part of virtual machine monitors (VMM) $275_1$-$275_N$ which implement virtual system support to coordinate operations between hypervisor 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an embodiment of the disclosure is included as a component in VMware's ESX brand software, which is commercially available from VMware, Inc.

Figure 3:
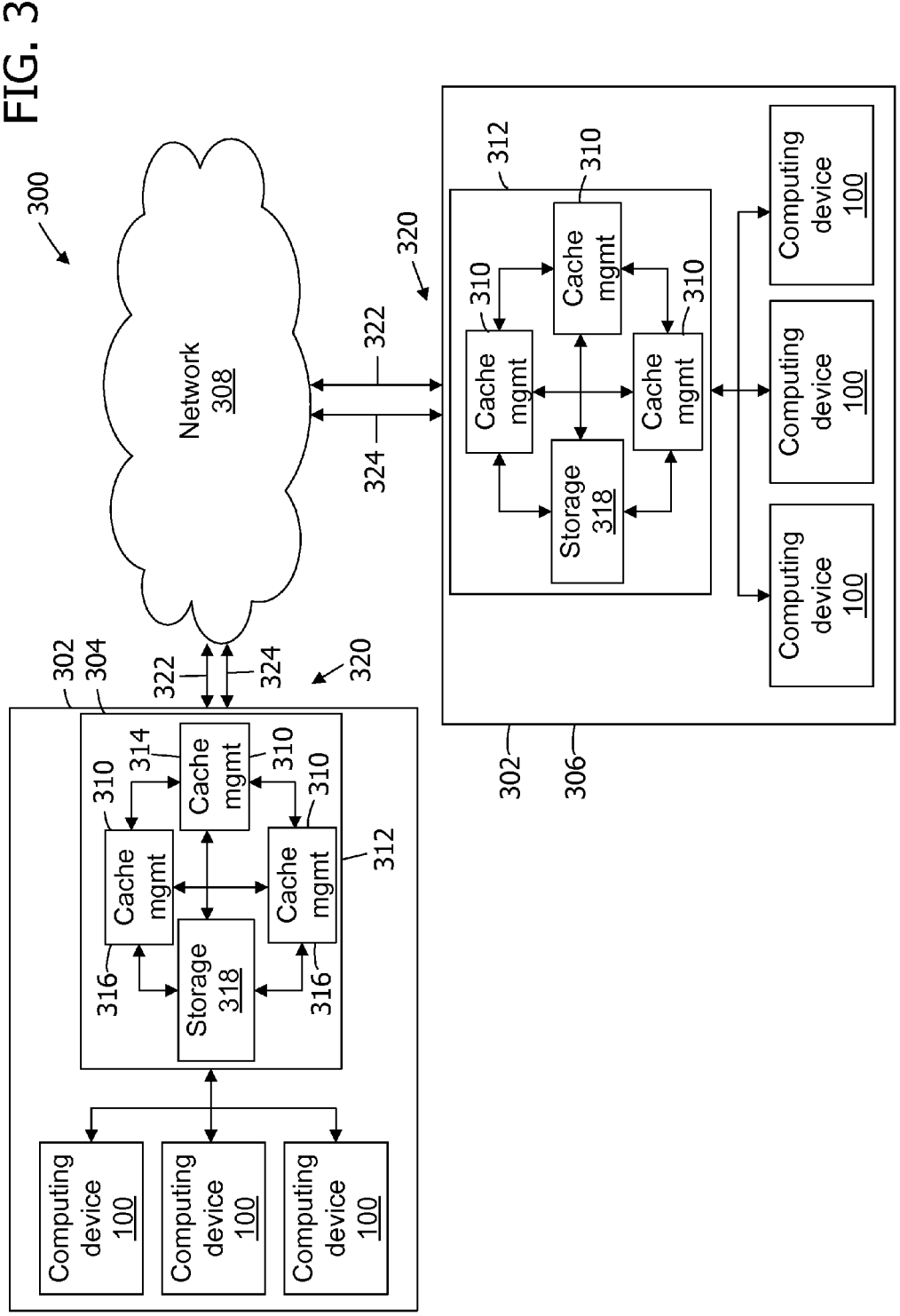
FIG. 3 is a block diagram of an exemplary network system including a plurality of computing devices, such as a plurality of computing devices shown in FIG. 1.

FIG. 3 is a block diagram of an exemplary network system 300 that includes a plurality of host computing devices 100. In an embodiment, network system 300 includes a plurality of sites 302, such as a first site 304 and a second site 306, that are coupled together by a network 308. Sites 302 may include one or more datacenters, office complexes, buildings, or any other site that enables network system 300 to function as described herein. In an embodiment, network 308 is a wide-area network (WAN) that couples together sites 302 that are remote from each other.

In one embodiment, each site 302 is a virtual location within one or more physical locations or computing devices 100. In such an embodiment, computing devices 100 within each site 302 may be one or more VMs.

In an embodiment, each site 302 includes a plurality of computing devices 100, such as a plurality of servers. In addition, each site 302 includes a plurality of cache management systems 310 arranged in a logical group, or cluster 312. For example, cluster 312 may include a first, or local, cache management system 314 and a plurality of cache management systems 316 that are peers of local cache management system 314 (also referred to as peer cache management systems 316).

Cache management systems 310 may be used with network traffic accelerator systems (not shown), such as a virtual traffic optimizer (VTO), to facilitate reducing a redundancy of data (also known as "deduplication" of the data) transmitted through network 308. In an embodiment, each cache management system 310 within a cluster 312 is coupled to each other cache management system 310 within cluster 312. In addition, each cache management system 310 is coupled to at least one storage device 318, such as a network attached storage (NAS), a storage area network (SAN), a datastore, random access memory (RAM), and/or any other storage device that enables network system 300 to function as described herein. In an embodiment, storage devices 318 include one or more caches used for temporary storage of data transmitted between computing devices 100, for example, between computing devices 100 positioned in different sites 302. While FIG. 3 illustrates a plurality of cache management systems 310 coupled to a single storage device 318, it should be understood that each cache management system 310 may be coupled to a separate storage device 318 and/or to any number of storage devices 318.

In an embodiment, cache management systems 310 of each cluster 312 are coupled to cache management systems 310 of at least one other cluster 312 to facilitate exchanging data between computing devices 100 of different sites 302. Specifically, each cache management system 310 within a site 302 is associated with a cache management system 310 at a different site 302 (hereinafter referred to as a "remote cache management system 310"). In addition, clusters 312 are positioned at, or proximate to, a network edge 320 of each site 302 to facilitate reducing a latency of file transfers to or from cache management systems 310 as compared to a latency of file transfers to or from other locations within site 302.

In some embodiments, cache management systems 310 establish a plurality of data channels to transmit data between systems 310. As used herein, the term "channel" refers to a physical or a virtual network connection between computing devices or VMs. In an embodiment, cache management system 310 may establish a first, or message data channel 322 with an associated remote cache management system 310, and may establish a second, or cache data channel 324 with the remote cache management system 310. Message data channel 322 may be used to transmit messages and/or other data between cache management systems 310, and cache data channel 324 may be used to update components of cache management systems 310 and/or to transmit cache management data between systems 310, as described more fully herein. Alternatively, message data channel 322 and/or cache data channel 324 may be used to transmit any suitable data between cache management systems 310.

During operation, a computing device 100 (referred to as a source computing device 100) of first site 304, for example, identifies a file to be transmitted to a computing device 100 of second site 306. Source computing device 100 transmits a fingerprint of the file, such as a hash value of the file, to a cache management system 310 of first site 304. As used herein, the term "fingerprint" refers to a key or value that identifies or represents a portion of data, such as a message or a message segment. In some embodiments, the fingerprint is unique such that each fingerprint is different from each other fingerprint within a system. In addition, as used herein, the term "message" refers to data, such as a file or a portion of a stream of data, that may be transmitted between computing devices or VMs. The term "message segment" refers to a portion of a message.

Cache management system 310 determines whether the fingerprint is stored within a cache associated with cache management system 310, or is stored within a cache associated with any other cache management system 310 within cluster 312 of first site 304. If the fingerprint is stored within a cache of first site cluster 312 (i.e., if a "cache hit" occurs), cache management system 310 transmits the fingerprint, rather than the file itself, to a destination computing device 100. Specifically, if the fingerprint is stored within the cache of first site cluster 312, the file itself is expected to be stored within a cache of a cache management system 310 of second site 306. Accordingly, once destination computing device 100 receives the fingerprint, destination computing device 100 retrieves the file (as indexed by, or associated with, the fingerprint) from the cache of second site cluster 312

However, if the fingerprint is not stored within a cache of first site cluster 312 (i.e., a "cache miss" occurs), cache management system 310 receives the file from source computing device 100 and transmits the file to destination computing device 100 through network 308. Cache management systems 310 of first site 304 and second site 306 store the file, and the fingerprint, in respective caches for later retrieval.

Figure 4:
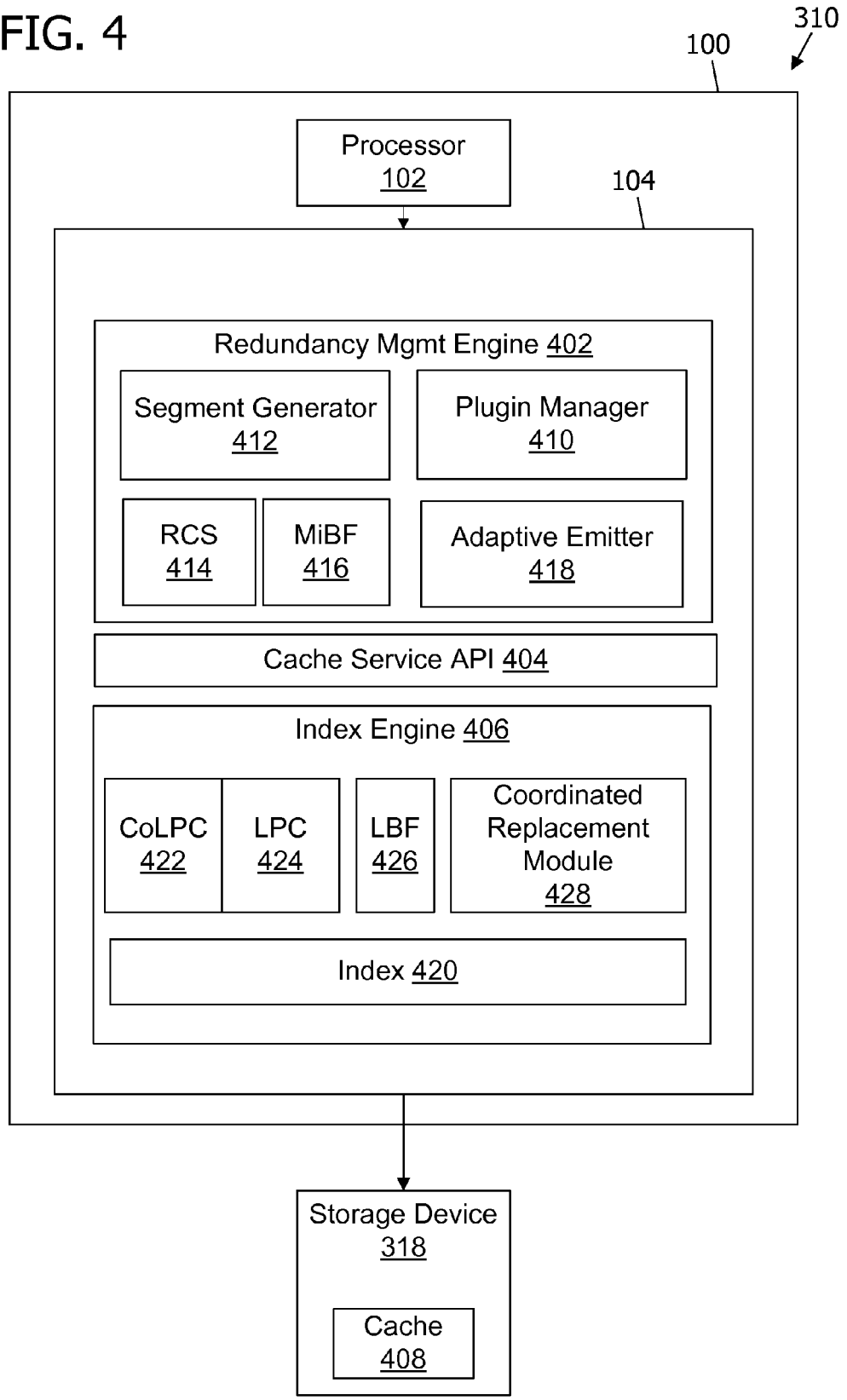
FIG. 4 is a block diagram of an exemplary cache management system shown in FIG. 3.

FIG. 4 is a block diagram of an exemplary cache management system 310. In an embodiment, cache management system 310 includes a plurality of program modules or components including a redundancy management engine 402, a cache service application programming interface (API) 404, and an index engine 406. In addition, cache management system 310 is coupled to storage device 318, and storage device 318 includes at least one cache 408. In an embodiment, cache 408 is a memory that stores message segments and/or messages transmitted between computing devices and between cache management systems associated with the computing devices.

In an embodiment, cache management system 310 is embodied within a computing device 100. Specifically, in an embodiment, cache management system 310 is stored within memory 104 and is executed by processor 102 to perform the functions described herein. Alternatively, cache management system 310 may be implemented as one or more VMs, or one or more programs or virtual appliances executing within a VM.

In an embodiment, redundancy management engine 402 facilitates reducing a redundancy of data transmitted between cache management system 310 and a remote cache management system. Redundancy management engine 402 provides an API to enable applications executing at a higher level than engine 402 to access the functions of cache management system 310. Redundancy management engine 402 includes a plurality of program modules or components including a plugin manager 410, a segment generator 412, a remote cache synchronizer 414, a mirrored bloom filter 416, and an adaptive emitter 418.

Plugin manager 410 enables applications to extend redundancy management engine 402 as desired. Segment generator 412 partitions a file or a stream of data received, for example, from a network buffer (not shown) into a plurality of message segments (also known as "chunks"). The message segments may be a fixed segment size, or may be variably sized, for example, based on a content type of the file or stream of data. In one embodiment, segment generator 412 generates a plurality of data chunks from the file or stream of data using an L4 or an L7 chunking algorithm. In addition, segment generator 412 calculates or generates a fingerprint for each message segment. In an embodiment, the fingerprint is a hash value obtained by executing a hash algorithm on each message segment.

Remote cache synchronizer 414 facilitates synchronizing caches within storage devices 318. In an embodiment, remote cache synchronizer 414 establishes a separate cache channel (not shown), such as a cache data channel, between two cache management systems, such as cache management system 310 and an associated remote cache management system. The cache data channel may be used to transmit and receive cache management data rather than transmitting and receiving the cache management data through a main data channel (not shown), such as a message data channel. For example, hit ratio data, LPC data, hit status data, and/or coordinated replacement algorithm data (described more fully herein) may be transmitted through the cache data channel using remote cache synchronizer 414. In addition, message segments may be transmitted through the cache data channel if a cache miss occurs while searching for the message segments within a remote cache.

Mirrored bloom filter 416 facilitates determining whether a cache miss will occur when searching for the message segment within a remote cache, i.e., whether a message segment is stored within a cache associated with a remote cache management system in a different datacenter or site. In an embodiment, mirrored bloom filter 416 is a copy of a local bloom filter within the remote cache management system. Mirrored bloom filter 416 maintains an array or another data structure that includes a bit mapping representative of each message segment fingerprint, and references the array to determine whether the message segment fingerprint, and thus the message segment itself, is stored within the remote cache. In an embodiment, mirrored bloom filter 416 is updated using remote cache synchronizer 414 (e.g., using the cache data channel). If the message segment fingerprint (or bit mapping thereof) is not stored in, or represented within, mirrored bloom filter 416, redundancy management engine 402 determines that there is a high likelihood that the message segment is not stored in the cache management system associated with mirrored bloom filter 416.

Adaptive emitter 418 assembles message segments together into a message and causes the message to be transmitted to another cache management system. In an embodiment, adaptive emitter 418 selects a heuristic transmission algorithm to use to transmit the message to the cache management system while facilitating reducing or minimizing a cache miss penalty and/or a transmission latency associated with the transmission.

In an embodiment, adaptive emitter 418 combines message segments into a message until a message transmission condition (or "trigger condition") is satisfied. The message transmission condition may be satisfied by determining that the length of the message equals or exceeds a predetermined message length threshold, and/or determining that a predetermined amount of time has elapsed since a message was last transmitted to the remote cache management system.

Adaptive emitter 418 executes a selection algorithm that determines which of a plurality of transmission algorithms is expected to have a target latency associated with the transmission of the message. In an embodiment, the selection algorithm determines an expected latency of a "query-before-send" (QbS) transmission algorithm and a "send-or-resend" (SoR) transmission algorithm, and selects the transmission algorithm that has the lowest expected latency. The transmission algorithms are described in more detail below.

In an embodiment, cache service API 404 is abstracted from the cache 408 stored within storage device 318. Cache service API 404 provides cache configuration, data insertion, data deletion, and data lookup functions to redundancy management engine 402.

Index engine 406 provides cache indexing functions to redundancy management engine 402. In addition, index engine 406 communicates with peer cache management systems to distribute cache requests and/or data between systems. In an embodiment, index engine 406 includes a plurality of program modules or components including an index 420, a coordinated locality preserved caching (LPC) module 422, a local LPC module 424, a local bloom filter 426, and a coordinated replacement module 428.

Index 420 stores fingerprints of message segments stored in cache 408, and provides links between the message segment fingerprints and the associated message segments stored in cache 408. In an embodiment, index 420 includes a hash table including hashes, or other fingerprints, of the message segments. Alternatively, index 420 may include any other organizational structure of fingerprints that enables cache management system 310 to function as described herein.

Coordinated LPC module 422 facilitates reducing a latency of determining whether a message segment fingerprint is indexed by an index engine of a remote cache management system, and thus, whether the message segment is likely to be stored within the remote cache. In an embodiment, coordinated LPC module 422 is a copy of an LPC module of the remote cache management system. Accordingly, coordinated LPC module 422 facilitates determining whether a message segment fingerprint is indexed by the remote cache management system, and therefore, whether the message segment associated with the message segment fingerprint is stored within the remote cache. In an embodiment, coordinated LPC module 422 is updated using remote cache synchronizer 414 (e.g., using the cache data channel).

Local LPC module 424 facilitates accessing spatially or location related message segments within cache 408. Local LPC module 424 is substantially similar to coordinated LPC module 422 except that local LPC module 424 is associated with cache 408, rather than the remote cache. Accordingly, local LPC module 424 facilitates determining whether a message segment fingerprint is indexed by cache management system 310, and therefore, whether the message segment associated with the message segment fingerprint is stored within cache 408.

Local bloom filter 426 facilitates determining whether a cache miss will occur when searching for the message segment within cache 408, i.e., whether the message segment is stored within cache 408. Specifically, local bloom filter 426 maintains an array or another data structure that includes a bit mapping representative of each message segment fingerprint, and references the array to determine whether the message segment fingerprint, and thus the message segment itself, is stored within cache 408. If the message segment fingerprint (or bit mapping thereof) is not stored in, or represented within, local bloom filter 426, redundancy management engine 402 determines that there is a high likelihood that the message segment is not stored in cache 408.

Coordinated replacement module 428 facilitates determining which data to replace within cache 408 and/or within a remote cache when a cache miss associated with the transmission of a message occurs. Specifically, coordinated replacement module 428 executes a coordinated replacement algorithm, defined more fully herein, that calculates a cost (e.g., a latency) of accessing a plurality of remote caches and selectively replaces entries within an index associated with the remote caches to facilitate reducing an average cost, or latency, of accessing the caches.

During operation, a stream of data from a computing device is received by cache management system 310 to be transmitted to a remote computing device through a remote cache management system. Segment generator 412 partitions the stream of data into message segments and generates a fingerprint, such as a hash value, for each message segment. In an embodiment, adaptive emitter 418 selects a transmission algorithm, such as a QbS or an SoR algorithm, to use for transmitting the message segments to the remote cache management system.

Cache management system 310 predicts whether each message segment is stored within the remote cache management system by determining whether each message segment fingerprint is stored within mirrored bloom filter 416, coordinated LPC module 422, local LPC module 424, local bloom filter 426, and/or index 420, depending on the transmission algorithm selected. If cache management system 310 predicts that the message segment is stored within the remote cache management system, system 310 transmits the message segment fingerprint to remote cache management system. Accordingly, the remote cache management system may retrieve the message segment from its remote cache, rather than consuming network bandwidth by receiving the message segment from cache management system 310. However, if cache management system 310 predicts that the remote cache management system does not have the message segment stored in the remote cache (i.e., a cache miss occurs), cache management system 310 transmits the message segment to the remote cache management system.

If the remote management system receives the message segment from cache management system 310, the remote management system stores the message segment in the remote cache and updates the LPC module and bloom filter stored in the remote management system. The updated contents of the LPC module and the bloom filter are transmitted to cache management system 310 (i.e., using remote cache synchronizer 414) for updating mirrored bloom filter 416 and coordinated LPC module 422. In an embodiment, if a cache miss associated with a message segment occurs, coordinated replacement module 428 facilitates determining cache and/or index data to be replaced to make room for the message segment and/or the message segment fingerprint.

Figure 5:
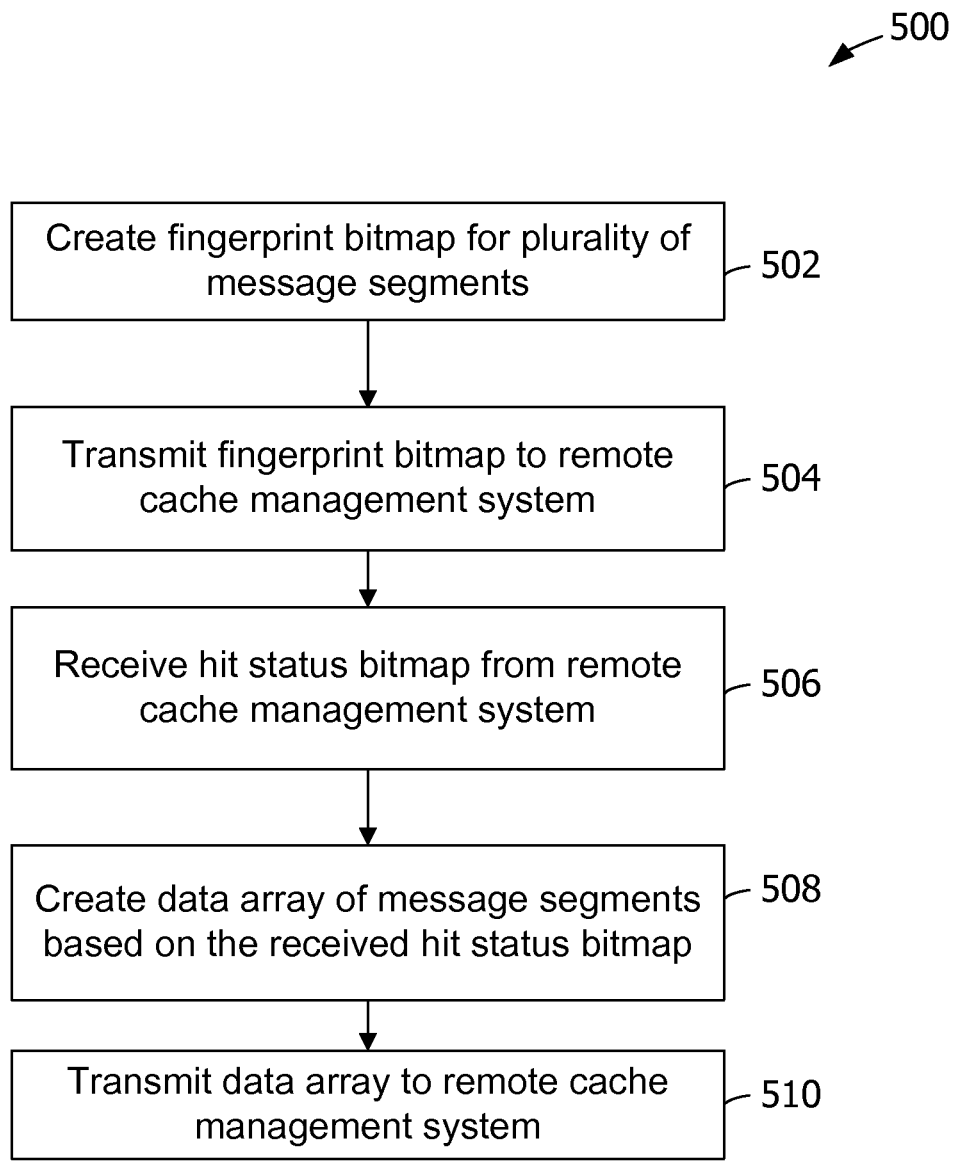
FIG. 5 is a flow diagram of an exemplary method for transmitting a message from a local cache management system to an associated remote cache management system.

FIG. 5 is a flow diagram of an exemplary method 500 of transmitting a message, including a plurality of message segments, from a local cache management system to an associated remote cache management system over a network. Specifically, method 500 describes a query-before-send (QbS) transmission algorithm that may be used to transmit one or more messages and/or message segments to the remote cache management system. In an embodiment, method 500 is embodied within a plurality of computer-executable instructions stored in a memory. The instructions are executed by a processor to perform the functions described herein.

A fingerprint bitmap, or array, is created 502 for a plurality of message segments within a message. The fingerprint bitmap is an array or another arrangement of fingerprints of the message segments. Specifically, in an embodiment, the fingerprint of each message segment is a hash value of the message segment. Alternatively, the fingerprint may be a checksum, a digital signature, or any other fingerprint of the message segment. In one embodiment, a segment generator of the local cache management system is used to create 502 the fingerprint bitmap.

The fingerprint bitmap is transmitted 504 to the remote cache management system to determine whether the message segments associated with the fingerprints are stored in a cache of the remote cache management system. In an embodiment, the remote cache management system determines whether the message segments are stored in the cache by searching for the fingerprints in a cache index, a bloom filter, and/or a locality preserved cache of the remote cache management system. The remote cache management system creates a hit status bitmap, or array, indicative of whether each message segment fingerprint is stored within the remote cache management system. The remote cache management system transmits the hit status bitmap to the local cache management system.

The local cache management system receives 506 the hit status bitmap from the remote cache management system and creates 508 a data array of message segments based on the received hit status bitmap. Specifically, the data array includes the message segment for each fingerprint identified by the hit status bitmap as not being stored in the remote cache management system.

The local cache management system transmits 510 the data array to the remote cache management system. Accordingly, the message segments stored in the remote cache can be retrieved from the remote cache, and the message segments not stored in the remote cache are included within the data array. The remote cache management system can therefore transmit the complete message, including each message segment, to a destination computing device.

Figure 6:
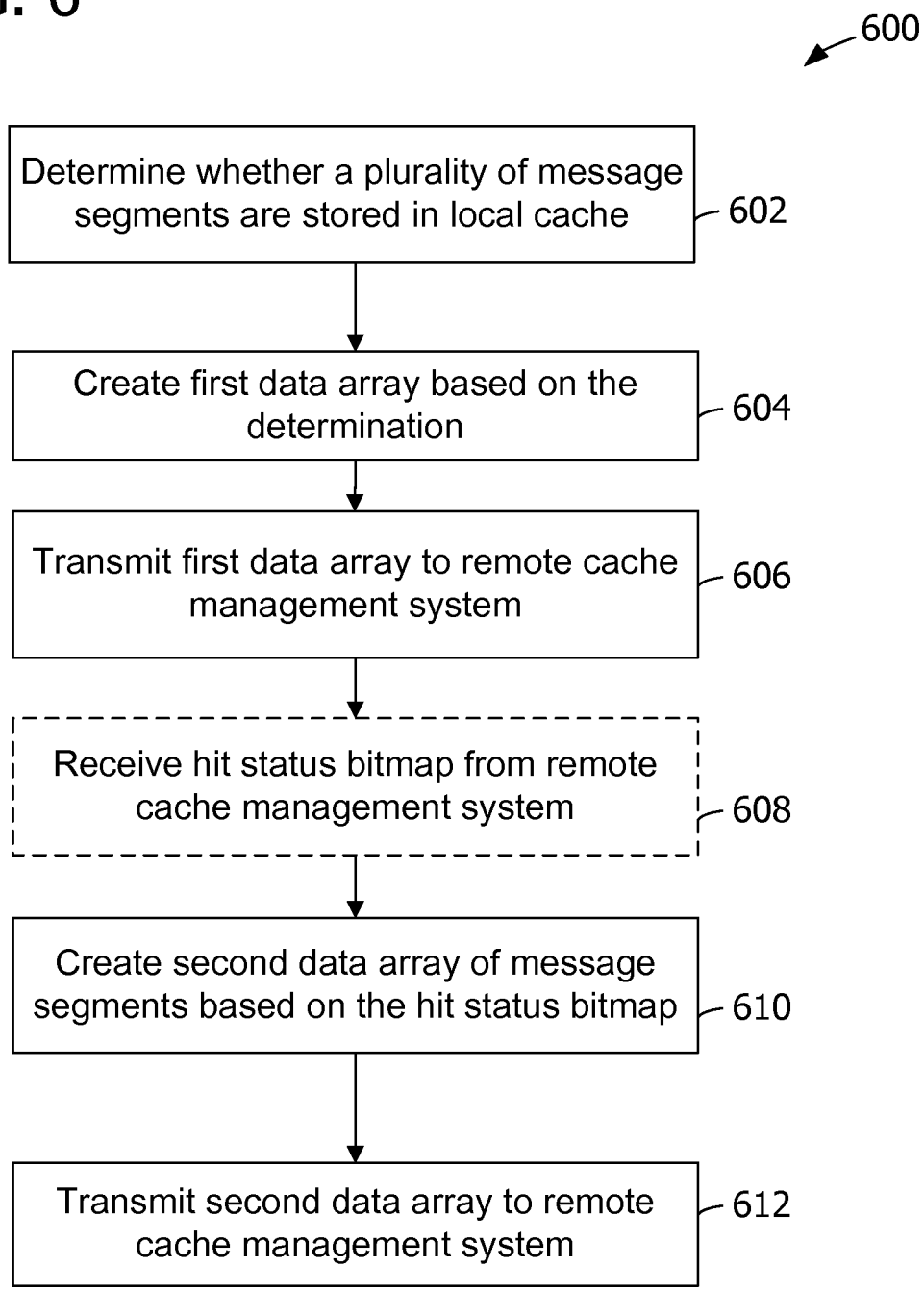
FIG. 6 is a flow diagram of another exemplary method for transmitting a message from a local cache management system to an associated remote cache management system.

FIG. 6 is a flow diagram of another exemplary method 600 of transmitting a message, including a plurality of message segments, from a local cache management system to an associated remote cache management system. Specifically, method 600 describes a send-or-resend (SoR) transmission algorithm that may be used to transmit one or more messages and/or message segments to the remote cache management system. The SoR algorithm is used to predict whether message segments are stored in a remote cache associated with the remote cache management system based on whether the message segments are stored within a local cache associated with the local cache management system. In an embodiment, method 600 is embodied within a plurality of computer-executable instructions stored in a memory. The instructions are executed by a processor to perform the functions described herein.

The local cache management system determines 602 whether a plurality of message segments (i.e, the message segments forming the message to be transmitted) are stored in a local cache of the system. For example, the local cache management system determines whether a fingerprint of each message segment is stored or represented within a local bloom filter, a local LPC module, a coordinated LPC module associated with the remote cache management system, and/or an index of the local cache to determine whether each message segment is stored within the local cache.

The local cache management system creates 604 a first data array based on the determination of whether each message segment is stored within the local cache. The first data array represents a prediction of whether each message segment is also stored within the remote cache. Specifically, the first data array includes a fingerprint of each message segment that was determined to be stored in the local cache, and includes the message segment itself for each message segment that was determined to not be stored in the local cache.

The local cache management system transmits 606 the first data array to the remote cache management system. The remote cache management system determines whether the message segments are stored in the cache by searching for the fingerprints in a cache index, a bloom filter, and/or a locality preserved cache of the remote cache management system. The remote cache management system creates a hit status bitmap, or array, indicative of whether each message segment fingerprint is stored within the remote cache management system. In one embodiment, the hit status bitmap indicates which message segments were determined to not be stored within the remote cache. The remote cache management system optionally transmits the hit status bitmap to the local cache management system. Specifically, if each message segment is determined to be stored within the remote cache, the remote cache management system may not transmit the hit status bitmap to the local cache management system. In one embodiment, if the local cache management system does not receive the hit status bitmap within a predetermined amount of time, the local cache management system assumes that each message segment was located within the remote cache.

If the hit status bitmap is transmitted, the local cache management system receives 608 the hit status bitmap from the remote cache management system and creates 610 a second data array of message segments based on the hit status bitmap. Specifically, the second data array of message segments includes the message segments indicated by the hit status bitmap as not being stored in the remote cache.

The local cache management system transmits 612 the second data array to the remote cache management system. Accordingly, the message segments stored in the remote cache can be retrieved from the remote cache, and the message segments not stored in the remote cache are included within the first data array and/or the second data array. The remote cache management system can therefore transmit the complete message, including each message segment, to a destination computing device.

Figure 7:
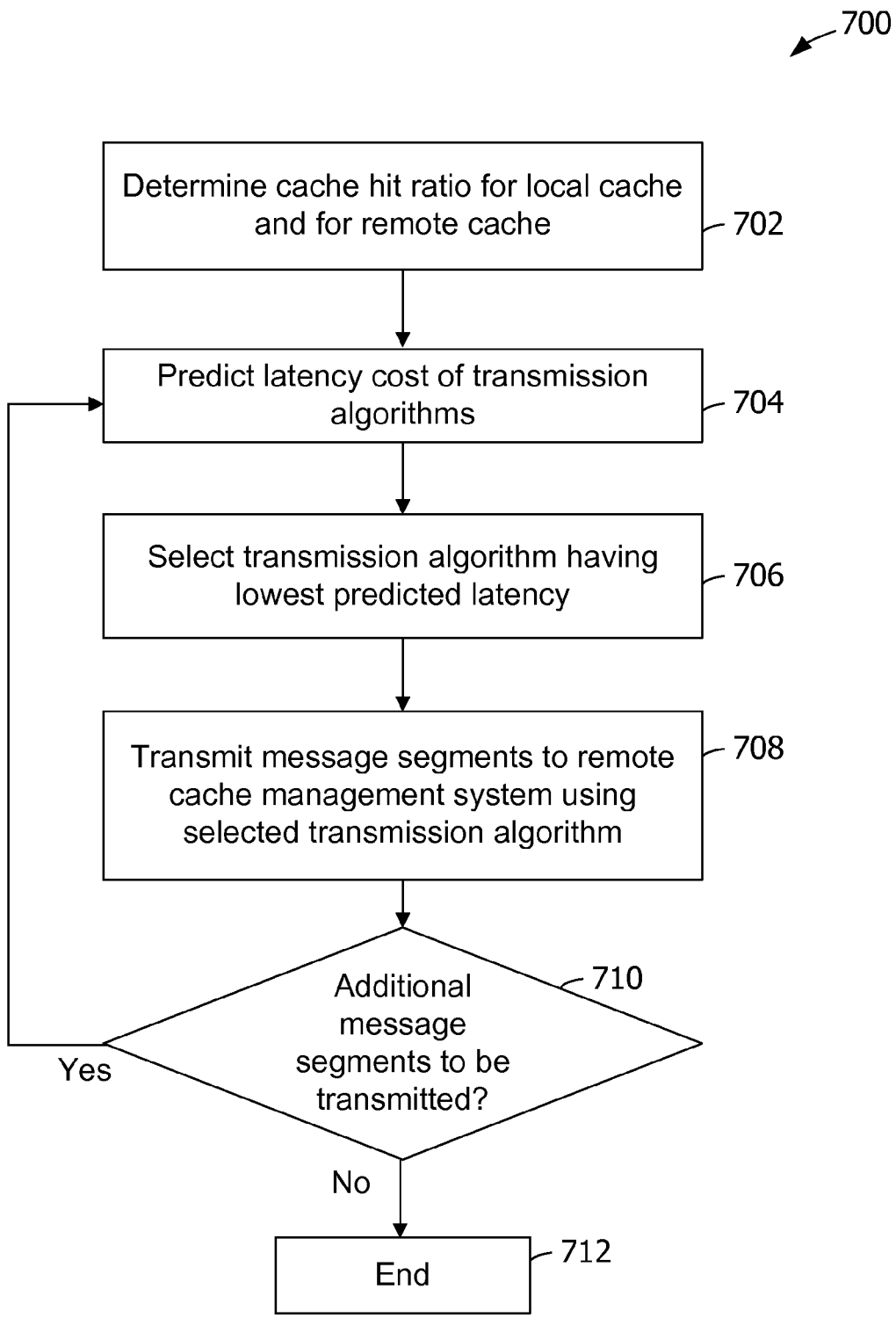
FIG. 7 is a flow diagram of yet another exemplary method for transmitting a message from a local cache management system to an associated remote cache management system.

FIG. 7 is a flow diagram of another exemplary method 700 of transmitting a message, including a plurality of message segments, from a local cache management system to an associated remote cache management system. Specifically, method 700 describes a selection algorithm that selects or determines a transmission algorithm that may be used to transmit one or more messages and/or one or more message segments to the remote cache management system. The transmission algorithms may include, for example, a query-before-send (QbS) algorithm and/or a send-or-resend (SoR) algorithm. In an embodiment, method 700 is embodied within a plurality of computer-executable instructions stored in a memory. The instructions are executed by a processor to perform the functions described herein. In an embodiment, method 700 is executed by an adaptive emitter within the local cache management system.

The local cache management system (e.g., the adaptive emitter) determines 702 a cache hit ratio for a local cache associated with the local cache management system and for a remote cache associated with the remote cache management system. The cache ratio is a ratio of the number of cache hits to the number of cache misses with respect to a cache, such as the local cache. The local cache management system predicts 704 an expected latency (also referred to as a "latency cost") of each transmission algorithm based on the determined cache hit ratio of the local cache, the determined cache hit ratio of the remote cache, the length of each message segment to be transmitted, an expected or average bandwidth of a network connection between the local cache management system and the remote cache management system, and an expected or average latency of communications between the local cache management system and the remote cache management system.

The transmission algorithm having the lowest predicted latency cost for the message segments is selected 706. The message segments are transmitted 708 to the remote cache management system using the selected transmission algorithm. If it is determined 710 that there are additional message segments to be delivered, method 700 returns to predicting 704 the latency cost of each transmission algorithm. If no additional message segments remain to be transmitted, method 700 ends 712.

Figure 8:
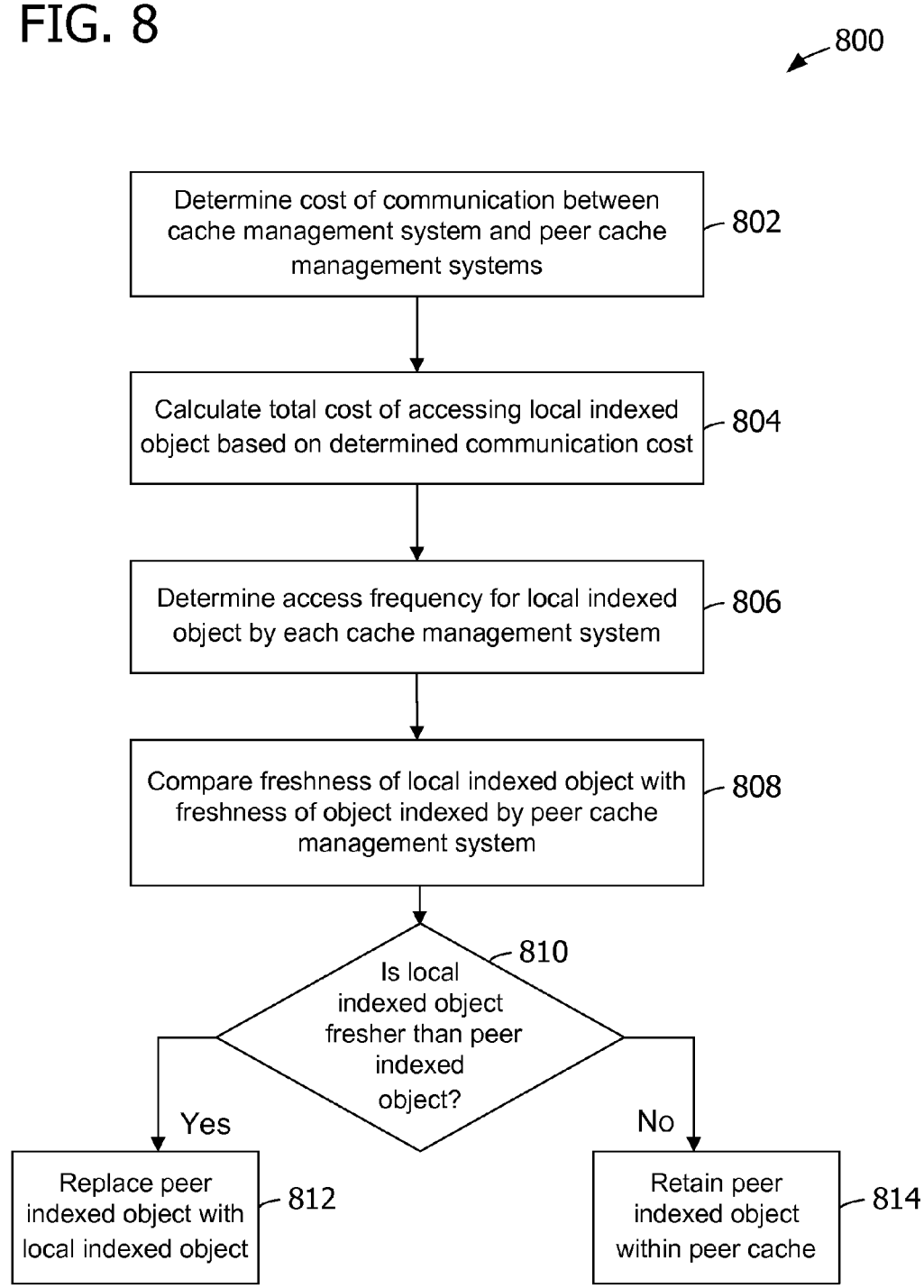
FIG. 8 is a flow diagram of an exemplary method of coordinating a replacement of cache data between a local cache management system and a plurality of peer cache management systems.

FIG. 8 is a flow diagram of an exemplary method 800 of coordinating a replacement of cache data between a local cache management system and a plurality of peer cache management systems. In an embodiment, method 800 describes a coordinated replacement algorithm that may be executed by a coordinated replacement module of the local cache management system and/or a coordinated replacement module of one or more peer cache management systems. In an embodiment, method 800 is embodied within a plurality of computer-executable instructions stored in a memory. The instructions are executed by a processor to perform the functions described herein.

During operation of a network system, a local cache associated with a local cache management system and/or one or more peer caches associated with one or more peer cache management systems may become full. Accordingly, if a cache miss occurs while accessing the local cache and/or the peer caches, data in the caches must be discarded if the data associated with the cache miss is to be stored within the caches. The data in the caches may be message segments to be transmitted to remote cache management systems or any other data. Method 800 facilitates determining which data to replace within the local cache and/or the peer caches when a cache miss occurs.

A cost, such as a latency cost, of communication between the local cache management system and a plurality of peer cache management systems is determined 802. A total cost (i.e., a total latency cost) of accessing a local indexed object is calculated 804 based on the determined communication cost.

An access frequency is determined 806 for a local indexed object by each peer cache management system. For example, the local indexed object may be a message segment indexed by a fingerprint stored in an index associated with a local cache. Each peer cache management system determines an access frequency of the message segment (i.e., how frequently each peer cache management system accesses the message segment and/or the message segment fingerprint).

A second replacement algorithm, such as a Greedy Dual replacement algorithm, is executed to determine a freshness of the local indexed object and to determine a freshness of an object indexed by each peer cache management system. As used herein, the term "freshness" refers to an indication of how recently an object was replaced or accessed within a cache, and may also refer to an indication of a time of expiration of the object (i.e., a time after which the object should be replaced). The freshness of the local indexed object is compared 808 to the freshness of each object indexed by the peer cache management system. Each peer cache management system determines 810 whether the local indexed object is fresher than the peer indexed object.

If the local indexed object is fresher than the peer indexed object, each peer cache management system replaces 812 the peer indexed object with the local indexed object within the peer caches. However, if the local indexed object is not fresher than the peer indexed object, the peer indexed object is retained 814 within the peer caches.

FIG. 9 is a flow diagram of an exemplary method 900 of transmitting a message segment from a local cache management system to a remote cache management system. In an embodiment, method 900 is embodied within a plurality of computer-executable instructions stored in a memory. The instructions are executed by a processor to perform the functions described herein.

A message segment is received 902 from a source, such as an application executing on a computing device. Specifically, in an embodiment, the source transmits a stream of data and/or one or more messages to the local cache management system, and a segment generator of the local cache management system partitions the data and/or messages into a plurality of message segments. The local cache management system predicts whether each message segment is stored within a remote cache associated with a remote cache management system.

The local cache management system determines 904 whether the message segment is represented within a mirrored bloom filter (i.e, a locally stored bloom filter associated with the remote cache management system). Specifically, the local cache management system determines whether a fingerprint of the message segment is within, or is represented within, the mirrored bloom filter. If the message segment is represented within the mirrored bloom filter, the fingerprint of the message segment is transmitted 906 to the remote cache management system. Method 900 returns to receiving 902 a message segment (e.g., the next message segment of the data stream or message). However, if the message segment is not represented within the mirrored bloom filter, the local cache management system determines 908 which of a plurality of transmission algorithms to use for transmitting the message segment or the message segment fingerprint to the remote cache management system.

If the local cache management system selects a QbS algorithm, the local cache management system transmits 910 the message segment fingerprint to the remote cache management system. The local cache management system receives 912 a hit status (e.g., a hit status bitmap) from the remote cache management system indicating whether the message segment fingerprint was stored within the remote cache management system. If the hit status indicates that the message segment fingerprint is not stored within the remote cache management system, the local cache management system transmits 914 the message segment to the remote cache management system. Method 900 returns to receiving 902 a message segment as described above.

If the local cache management system selects an SoR algorithm, the local cache management system determines 916 whether the message segment fingerprint is stored in a coordinated LPC module. The coordinated LPC module is stored within the local cache management system and is associated with an LPC module stored within the remote cache management system. If the message segment fingerprint is stored in the coordinated LPC module, the local cache management system predicts that the message segment is already stored within the remote cache. Accordingly, the local cache management system transmits 918 the message segment fingerprint to the remote cache management system to enable the remote cache system to retrieve the message segment from the remote cache.

However, if the message segment fingerprint is not within the coordinated LPC module, the local cache management module determines 920 whether the fingerprint is in a local LPC module (i.e., an LPC module that is stored within the local cache management module and that is associated with the local cache). If the message segment fingerprint is stored in the local LPC module, the local cache management system predicts that the message segment is already stored within the remote cache. Accordingly, the local cache management system transmits 918 the message segment fingerprint to the remote cache management system to enable the remote cache system to retrieve the message segment from the remote cache.

If the message segment fingerprint is not within the local LPC module, the local cache management system determines 922 whether the fingerprint is stored within a local index (i.e., within an index associated with the local cache). If the message segment fingerprint is stored in the local index, the message segment is predicted to already be stored within the remote cache. Accordingly, the local cache management system transmits 918 the message segment fingerprint to the remote cache management system to enable the remote cache system to retrieve the message segment from the remote cache.

However, if the message segment fingerprint is not within the local index, the message segment is predicted to not be stored within the remote cache. Accordingly, the local cache management system transmits 924 the message segment to the remote cache management system. The remote cache management system may store the message segment in the remote cache and/or may store the fingerprint of the message segment in a bloom filter, an LPC module, and/or an index associated with the remote cache. Method 900 returns to receiving 902 a message segment as described above.

Exemplary Operating Environment

The cache management system as described herein may be performed by a computer or computing device. A computer or computing device may include one or more processors or processing units, system memory, and some form of computer-readable media. Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media store information such as computer-readable instructions, data structures, program modules, or other data. Communication media typically embody computer-readable instructions, data structures, program modules, or other data in a modulated data signal such as a carrier wave or other transport mechanism and include any information delivery media. Combinations of any of the above are also included within the scope of computer-readable media.

Although described in connection with an exemplary computing system environment, embodiments of the disclosure are operative with numerous other general purpose or special purpose computing system environments or configurations. Examples of well known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The operations illustrated and described herein may be implemented as software instructions encoded on a computer-readable medium, in hardware programmed or designed to perform the operations, or both. For example, aspects of the disclosure may be implemented as a system on a chip.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   a processor; and
   a memory device coupled to the processor, the memory device comprising a local cache management system that is executable by the processor and that is configured to be coupled to a local cache, wherein the local cache management system comprises:
   an index engine configured to store an array of one or more fingerprints of message segments stored in the local cache; and
   a redundancy management engine coupled to the index engine, the redundancy management engine comprising an adaptive emitter configured to:
   receive a message segment to be transmitted to a remote device;
   determine expected latency costs for transmission of the message segment by a plurality of transmission algorithms;

select a transmission algorithm of the plurality of transmission algorithms on a basis of the determined expected latency costs;
determine whether the message segment is stored within a remote cache management system associated with the remote device; and
transmit the message segment through a network to the remote cache management system using the selected transmission algorithm upon a determination that the message segment is not stored within the remote cache management system.

2. The system of claim 1, wherein the adaptive emitter is further configured to:
a) transmit the array of one or more fingerprints of the message segment to the remote cache management system to determine whether the message segment is stored within the remote cache management system; and
b) select the transmission algorithm having the lowest of the determined expected latency costs for transmission of the message segment.

3. The system of claim 1, wherein the local cache management system further comprises a mirrored bloom filter that is associated with a bloom filter of the remote cache management system.

4. The system of claim 3, wherein the adaptive emitter is further configured to determine whether the message segment is stored within the remote cache management system by determining whether a fingerprint of the message segment is represented within the mirrored bloom filter.

5. The system of claim 1, wherein the local cache management system further comprises a coordinated locality preserved caching (LPC) module that is associated with an LPC module of the remote cache management system.

6. The system of claim 5, wherein the adaptive emitter is further configured to determine whether the message segment is stored within the remote cache management system by determining whether a fingerprint of the message segment is stored within the coordinated LPC module.

7. The system of claim 1, wherein the local cache management system further comprises a local LPC module that is associated with the local cache.

8. The system of claim 7, wherein the adaptive emitter is further configured to determine whether the message segment is stored within the remote cache management system by determining whether a fingerprint of the message segment is stored within the local LPC module.

9. The system of claim 1, wherein the local cache management system further comprises a remote cache synchronizer that facilitates updating at least one component of the local cache management system using a data channel that is separate from a data channel used to transmit the message segment to the remote cache management system.

10. The system of claim 1, wherein the local cache management system is configured to be coupled to at least one peer cache management system, and wherein the local cache management system further comprises a coordinated replacement module configured to replace a data object stored within the local cache based on a determined cost of accessing the data object by the peer cache management system.

11. A method of transmitting a message segment from a local cache management system to a remote cache management system, the method comprising:
determining a cache hit ratio of a local cache associated with the local cache management system;
determining a cache hit ratio of a remote cache associated with the remote cache management system;
determining, by the local cache management system, expected latency costs for transmission of the segment by a plurality of transmission algorithms;
selecting, by the local cache management system, a transmission algorithm of the plurality of transmission algorithms on a basis of the determined expected latency costs; and
transmitting, using the selected transmission algorithm, at least one message segment from the local cache management system to the remote cache management system.

12. The method of claim 11, wherein selecting a transmission algorithm comprises selecting a query-before-send (QbS) algorithm that determines whether an array of one or more fingerprints of the message segment is stored within the remote cache management system before transmitting the message segment to the remote cache management system.

13. The method of claim 12, further comprising transmitting the array of one or more fingerprints to the remote cache management system to determine whether the array of one or more fingerprints is stored within the remote cache management system.

14. The method of claim 13, further comprising receiving a hit status from the remote cache management system, wherein the hit status indicates whether the array of one or more fingerprints is stored within the remote cache management system.

15. The method of claim 14, further comprising transmitting the message segment to the remote cache management system if the hit status indicates that the array of one or more fingerprints is not stored within the remote cache management system.

16. The method of claim 11, wherein selecting a transmission algorithm comprises selecting a send-or-resend (SoR) algorithm that predicts whether a fingerprint of the message segment is stored within the remote cache management system before transmitting the message segment to the remote cache management system.

17. The method of claim 11, further comprising determining whether the fingerprint is stored within the local cache management system to predict whether the fingerprint is stored within the remote cache management system, wherein the transmission algorithm is selected on a basis of achieving a lowest expected latency cost for transmission of the message segment.

18. The method of claim 17, wherein the local cache management system includes at least one of a coordinated locality preserved caching (LPC) module, a local LPC module, and an index associated with the local cache, and wherein determining whether the fingerprint is stored within the local cache management system comprises determining whether the fingerprint is stored within at least one of the coordinated LPC module, the local LPC module, and the index.

19. The method of claim 17, further comprising transmitting the message segment to the remote cache management system if the fingerprint is determined to not be stored within the local cache management system.

20. The method of claim 17, further comprising transmitting the fingerprint to the remote cache management system if the fingerprint is determined to be stored within the local cache management system.

21. A computer-readable storage medium having computer executable instructions embodied thereon, wherein, when executed by a processor of a local cache management system, the computer-executable instructions cause the processor to:
receive a message segment to be transmitted to a remote cache management system;

determine whether the message segment is represented in a mirrored bloom filter that is associated with the remote cache management system;

transmit a fingerprint of the message segment to the remote cache management system if the message segment is determined to be represented in the mirrored bloom filter; and select one of a first transmission algorithm and a second transmission algorithm if the message segment is determined to not be represented in the mirrored bloom filter.

22. The computer-readable storage medium of claim 21, wherein the computer-executable instructions further cause the processor to transmit the fingerprint to the remote cache management system if the first transmission algorithm is selected.

23. The computer-readable storage medium of claim 22, wherein the computer-executable instructions further cause the processor to receive a hit status indicating whether the fingerprint is stored within the remote cache management system.

24. The computer-readable storage medium of claim 23, wherein the computer-executable instructions further cause the processor to transmit the message segment to the remote cache management system if the hit status indicates that the fingerprint is not stored within the remote cache management system.

25. The computer-readable storage medium of claim 21, wherein the computer-executable instructions further cause the processor to determine whether the fingerprint is stored within the local cache management system if the second transmission algorithm is selected.

26. The computer-readable storage medium of claim 25, wherein the computer-executable instructions further cause the processor to transmit the fingerprint to the remote cache management system if the fingerprint is determined to be stored within the local cache management system.

27. The computer-readable storage medium of claim 25, wherein the computer-executable instructions further cause the processor to transmit the message segment to the remote cache management system if the fingerprint is determined to not be stored within the local cache management system.

* * * * *